(12) United States Patent
Mruk et al.

(10) Patent No.: US 7,669,626 B1
(45) Date of Patent: Mar. 2, 2010

(54) TIRE WITH COMPONENT CONTAINING POLYKETONE SHORT FIBER AND POLYETHYLENEIMINE

(75) Inventors: Ralf Mruk, Colmar-Berg (LU); Frank Schmitz, Bissen (LU); Serge Julien Auguste Imhoff, Schrondweiler (LU); Annette Lechtenboehmer, Ettelbruck (LU); Julia Martine Francoise Claudine Tahon, Bereldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/266,573

(22) Filed: Nov. 7, 2008

(51) Int. Cl.
    *B60C 9/12* (2006.01)
    *C08G 73/02* (2006.01)

(52) U.S. Cl. ............... 152/458; 523/206; 524/500; 525/153; 525/186

(58) Field of Classification Search ........ 152/458; 523/206; 524/500; 525/153, 186
See application file for complete search history.

(56) References Cited

U.S. PATENT DOCUMENTS

| | | | | |
|---|---|---|---|---|
| 3,953,223 A | * | 4/1976 | Doran et al. ............ | 106/491 |
| 3,994,742 A | * | 11/1976 | Russell et al. ............ | 106/491 |
| 6,818,728 B2 | | 11/2004 | Kato et al. ............... | 528/220 |
| 6,881,478 B2 | | 4/2005 | Kato et al. ............... | 428/364 |
| 7,037,396 B2 | * | 5/2006 | Naito et al. .............. | 156/115 |
| 7,530,380 B2 | * | 5/2009 | Muraoka et al. ......... | 152/510 |
| 2004/0112506 A1 | * | 6/2004 | Naito et al. .............. | 156/115 |
| 2005/0126673 A1 | | 6/2005 | Miyazaki et al. ......... | 152/527 |
| 2006/0213597 A1 | | 9/2006 | Takimura ................ | 152/537 |
| 2006/0290031 A1 | | 12/2006 | Jirsak et al. ............. | 264/465 |

FOREIGN PATENT DOCUMENTS

| | | | |
|---|---|---|---|
| DE | 1444109 | * | 1/1968 |
| JP | 01014256 | * | 7/1987 |
| JP | 2001003273 | * | 1/2001 |

* cited by examiner

*Primary Examiner*—Bernard Lipman
(74) *Attorney, Agent, or Firm*—John D. DeLong

(57) ABSTRACT

The present invention is directed to a pneumatic tire comprising at least one component, the at least one component comprising a rubber composition, the rubber composition comprising a diene based elastomer and from 1 to 30 parts by weight, per 100 parts by weight of elastomer (phr), of a polyketone short fiber having a length ranging from 0.5 to 20 mm having a weight ranging from 0.5 to 5 decitex, and from 1 to 15 phr of a polyethyleneimine having an average molecular weight of 800 to 2000000.

11 Claims, 1 Drawing Sheet

TIRE WITH COMPONENT CONTAINING POLYKETONE SHORT FIBER AND POLYETHYLENEIMINE

BACKGROUND OF THE INVENTION

Figure 1:
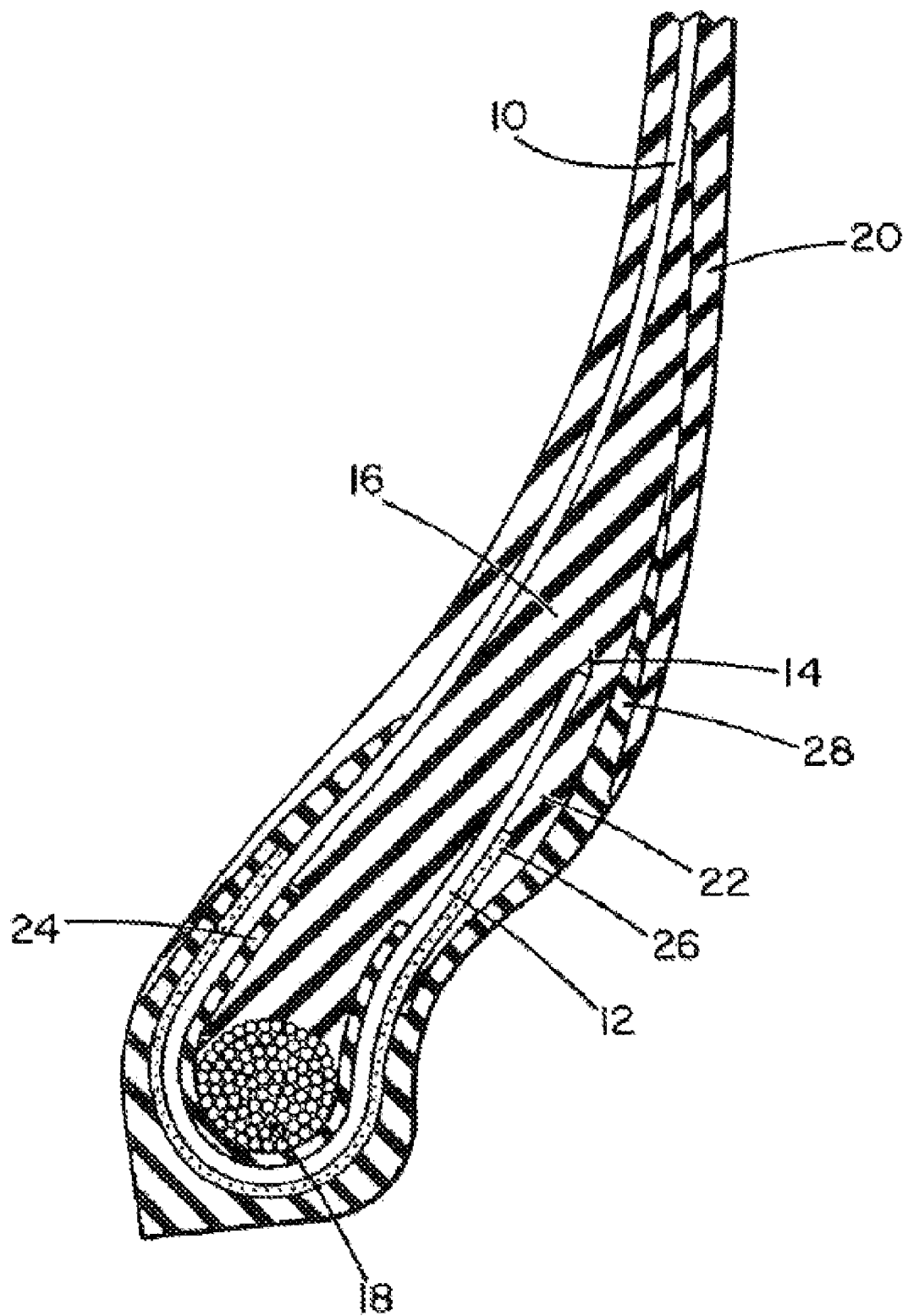

Rubber components for use in pneumatic tires are sometimes reinforced with short textile fibers. In general, the presence of short fibers in a cured rubber compound results in an increase in initial or low strain (low elongation) modulus (stiffness). Concomitantly, the presence of short fibers in the rubber often times results in reduced fatigue endurance and in higher hysteretic heat build-up under periodic stresses.

Improvement in the performance of tires containing short fibers can be obtained by treating the surface of the fibers with chemical adhesives to improve the adhesion between the fiber and the rubber. However, such surface treatments do not always result in the desired performance.

There is, therefore, a need for an improved tire with a component containing short fibers.

SUMMARY OF THE INVENTION

The present invention is directed to a pneumatic tire comprising at least one component, the at least one component comprising a rubber composition, the rubber composition comprising a diene based elastomer and from 1 to 30 parts by weight, per 100 parts by weight of elastomer (phr), of a polyketone short fiber having a length ranging from 0.5 to 20 mm having a weight ranging from 0.5 to 5 decitex, and from 1 to 15 phr of a polyethyleneimine having an average molecular weight of 800 to 2000000.

DETAILED DESCRIPTION OF THE INVENTION

There is disclosed a pneumatic tire comprising at least one component, the at least one component comprising a rubber composition, the rubber composition comprising a diene based elastomer and from 1 to 30 parts by weight, per 100 parts by weight of elastomer (phr), of a polyketone short fiber having a length ranging from 0.5 to 20 mm having a weight ranging from 0.5 to 5 decitex, and from 1 to 15 phr of a polyethyleneimine having a number-average molecular weight of 800 to 2000000.

The rubber composition includes a polyketone short fiber. In one embodiment, suitable polyketone fiber is produced by methods as taught for example in U.S. Pat. Nos. 6,818,728 and 6,881,478, the teachings of both of which are fully incorporated herein by reference. After production of polymeric fiber, the fiber may be cut to the desired length by methods as are known in the art.

In one embodiment, the polyketone fibers are as disclosed in U.S. Pat. Nos. 6,818,728 and 6,881,478 and comprise a polyketone containing a ketone unit shown by the following formula (I) as a main repeating unit, and have an intrinsic viscosity of not less than 0.5 dl/g, a crystal orientation of not less than 90%, a density of not less than 1.300 g/cm.sup.3, an elastic modulus of not less than 200 cN/dtex, and a heat shrinkage of −1 to 3%.

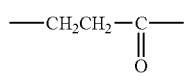

I

Furthermore, the polyketone fibers of the present invention can be produced by wet spinning a polyketone solution having a phase separation temperature in the range of 0-150° C. Suitable polyketone fibers can be produced as disclosed in U.S. Pat. Nos. 6,818,728 and 6,881,478 by wet spinning a polyketone solution which comprises a polyketone containing a ketone unit represented by the above formula (I) as a main repeating unit and having a molecular weight distribution of 1-6 and a Pd content of not more than 50 ppm and a solvent for dissolving the polyketone and which has a phase separation temperature in a range of 0-150° C. More specifically, the polyketone fibers can be produced by heating the above polyketone solution to a temperature higher than the phase separation temperature, then extruding the solution into a coagulating bath having a temperature lower than the phase separation temperature to form a fibrous material, thereafter removing a part or the whole of the solvent which dissolves the polyketone from the fibrous material, stretching the fibrous material and winding up the fibrous material. The wound long fiber may then be cut to the desired short lengths using methods as are known in the art.

In one embodiment, the polyketone short fiber has an average length of from 0.5 to 20 mm. In one embodiment, the polyketone short fiber has an average length of from 1 to 10 mm. In one embodiment, the polyketone short fiber has a weight ranging from 0.5 to 5 decitex (decitex=1 gm/10000 m). In one embodiment, the polyketone short fiber has a weight ranging from 1 to 3 decitex.

In one embodiment, the polyketone short fiber is present in the rubber composition in a concentration ranging from 1 to 30 parts by weight per 100 parts by weight of diene based elastomer (phr). In another embodiment, the polyketone short fiber is present in the rubber composition in a concentration ranging from 2 to 20 parts by weight per 100 parts by weight of diene based elastomer (phr). In another embodiment, the polyketone short fiber is present in the rubber composition in a concentration ranging from 5 to 15 parts by weight per 100 parts by weight of diene based elastomer (phr).

The rubber composition also includes an polyethyleneimine. In one embodiment, the polyethyleneimine has an average molecular weight of 800 to 2000000, preferably 1000 to 20000, more preferably 2000 to 4000. Suitable polyethyleneimine is available commercially as Lupasol from BASF.

In one embodiment, the rubber composition includes from 1 to 15 phr of polyethyleneimine. In one embodiment, the rubber composition includes from 1.5 to 10 phr of polyethyleneimine. In one embodiment, the rubber composition includes from 2 to 8 phr of polyethyleneimine.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene;

olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, c is 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 28 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, c is 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis* & *Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

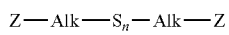

in which Z is selected from the group consisting of

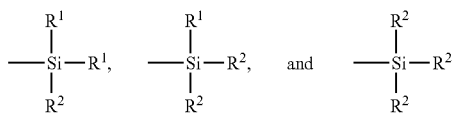

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula III, Z may be

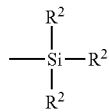

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner.

In one embodiment, the component is a apex, flipper or chipper. In this embodiment, the rubber composition is milled, calendared or extruded to form the apex, flipper, or chipper. The formed component will have the short fibers with an orientation in the direction of processing, that is, a substantial portion of the fibers will generally be oriented in a direction which is consistent with and parallel to the material flow direction in the processing equipment. The rubber composition will have a degree of anisotropy, that is, a modulus measured in a direction consistent with the processing direction will be greater than that measured in a direction perpendicular to the processing direction. The rubber composition is incorporated into an apex, flipper or chipper.

With reference now to FIG. 1, a tire according to the invention contains a carcass ply 10 with a turn-up portion 12 and a terminal end 14. The apex 16 is in the immediate proximity of the carcass ply turn-up 14 including the area above the bead 18 and is encased by the carcass ply 10 and carcass ply turn-up 12 or sidewall compound 20. The apex also includes the area 22 located between the lower sidewall 20 and the axially outer side of the carcass ply turn-up 12. The interface between the bead 18 and the carcass ply 10 is a flipper 24. Located outside of the carcass ply 10 and extending in an essentially parallel relationship to the carcass ply 10 is the chipper 26. Located around the outside of the bead 18 is the chafer 28 to protect the carcass ply 12 from the rim (not shown), distribute flexing above the rim, and seal the tire. At least one of apex 16, flipper 24, or chipper 26 comprises the rubber composition as described herein.

In one embodiment, the component is a flipper. In prior art applications, a flipper typically comprises textile cord. In such a flipper application, the cord cannot be oriented in a zero degree radial direction to the radial direction of the tire, due to the increase in radius experienced at the bead during tire build. Typically then, the cords are placed at a 45 degree angle with respect to the radial direction of the tire, to allow for the radius increase and deformation of the flipper during tire build; see for example, U.S. Pat. No. 6,659,148. By contrast, a with the short fiber composition of the present invention, the flipper may be constructed such that the short fibers may be oriented at zero degrees with respect to the radial direction of the tire. This is desirable to provide additional support at the bead to counteract the directional stresses experienced at the bead. Thus, the flipper of the present invention is not restricted from a zero degree orientation, but may in one embodiment exist with the short fibers substantially oriented in an angle ranging from 0 to 90 degrees with respect to the radial direction of the tire. By substantially oriented, it is meant that the flipper compound is disposed such that with regard to the dimension of the flipper corresponding to that parallel to the direction of propagation through the flipper's fabrication process (i.e. calendar or extruded), that dimension may be oriented at an angle ranging from 0 to 90 degrees with respect to the radial direction of the tire. In another embodiment, the flipper may be disposed with the fibers oriented at an angle ranging from 0 to 45 degrees with respect to the radial direction of the tire. In another embodiment, the flipper may be disposed with the fibers oriented at an angle ranging from 0 to 20 degrees with respect to the radial direction of the tire. In another embodiment, the flipper may be disposed with the fibers oriented at an angle ranging from 0 to 10 degrees with respect to the radial direction of the tire.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, the effect of adding a polyketone short fiber and an polyethyleneimine to a rubber composition according to the present invention is illustrated. Rubber compositions containing diene based elastomer, fillers, process aids, antidegradants, and curatives were prepared following recipes as shown in Table 1, with all amounts given in parts by weight per 100 parts by weight of base elastomer (phr). Sample 1 contained no fiber or polyethyleneimine and served as a control. Sample 2 included polyketone short fibers and Sample 3 contained polyethyleneimine, and are comparative. Sample 4 contained both polyketone fibers and polyethyleneimine and is representative of the present invention.

The samples were tested for viscoelastic properties using RPA. "RPA" refers to a Rubber Process Analyzer as RPA 2000 instrument by Alpha Technologies, formerly the Flexsys Company and formerly the Monsanto Company. References to an RPA 2000 instrument may be found in the following publications: H. A. Palowski, et al, Rubber World, June 1992 and January 1997, as well as Rubber & Plastics News, Apr. 26 and May 10, 1993.

The "RPA" test results in Table 2 are reported as being from data obtained at 100° C. in a dynamic shear mode at a frequency of 1 hertz and at the reported dynamic strain values. Tensile and hardness properties were also measured and reported in Table 2.

Cold Tensile rubber samples were milled into a sheet and cut into tensile test specimens. Tensile test specimens were cut in two orientations, one with the test pulling direction parallel with the milling direction of the specimen, and one with the test pulling direction perpendicular with the milling direction of the specimen. In this way, the effect of fiber orientation (generally in the direction of milling) and thus the anisotropy of the rubber composition was measured.

TABLE 1

| Non Productive Mix Step | |
| --- | --- |
| Natural Rubber | 100 |
| Polyethyleneimine[1] | variable as per Table 2 |
| Carbon Black[2] | variable as per Table 2 |
| Resorcinol | 1.8 |
| Antidegradants[3] | 0.85 |
| ZnO | 3 |
| Stearic Acid | 3 |
| Polyketone Fiber[4], 3 mm | variable as per Table 2 |
| Productive Mix Step | |
| Hexamethylenetetramine | 1.3 |
| Sulfur[5] | 2.5 |
| Accelerator[6] | 1.1 |

[1] Polyethyleneimine by BASF, Tradename Lupasol PR 8515, molecular weight 2000
[2] HAF
[3] p-phenylene diamine and quinoline types
[4] 3 mm average length
[5] Mixed insoluble and elemental sulfur
[6] Sulfenamide type

TABLE 2

| Sample No. | 1 | 2 | 3 | 5 |
| --- | --- | --- | --- | --- |
| Carbon Black, phr | 46 | 28 | 46 | 28 |
| Polyketone, phr | 0 | 15 | 0 | 15 |
| Polyethyleneimine, phr | 0 | 0 | 2 | 2 |

TABLE 3

RPA2000

Cured 18 min @ 150° C., Frequency = 1.7 Hz, Dyn Strain = 0.7%

| | | | | |
| --- | --- | --- | --- | --- |
| Max Torque dN·m | 2.1 | 3.5 | 3.8 | 2.4 |
| T90 min | 6.1 | 7.1 | 4.5 | 3.8 |

Test: @ 100° C., Frequency = 11 Hz, Strain Sweep

| | | | | |
| --- | --- | --- | --- | --- |
| TD (2) 1% strain | 0.105 | 0.033 | 0.053 | 0.037 |
| TD (5) 5% strain | 0.159 | 0.046 | 0.091 | 0.041 |
| TD (7) 10% strain | 0.17 | 0.043 | 0.109 | 0.049 |

MDR2000 LIGHT TIRE

Test: @ 150° C.

| | | | | |
| --- | --- | --- | --- | --- |
| Mm Torque dN·m | 2.5 | 2.3 | 3.3 | 3.8 |
| Max Torque dN·m | 26.8 | 25.6 | 22.2 | 17.9 |
| Delta Torque dN·m | 24.3 | 23.2 | 18.9 | 14.1 |
| T90 min | 6.3 | 7.1 | 4.5 | 4.0 |

Ring Modulus

Cure: 10 mm @ 150° C.; Test: @ 23° C., Pulling Speed = 50 cm/min

| | | | | | |
| --- | --- | --- | --- | --- | --- |
| Elongation | % | 466.9 | 159.9 | 452.8 | 236.3 |
| Elongation Relative to Sample 1 | | 1 | 0.34 | 0.97 | 0.51 |
| 100% Modulus | MPa | 3.6 | 8.1 | 2.8 | 5.6 |
| Tensile Strength | MPa | 25.6 | 9.8 | 22.2 | 9.1 |
| Rebound Value | % | 57.9 | 65.54 | 64.26 | 69.8 |
| Shore A | | 73 | 80.5 | 70.5 | 74.8 |

Tear

Cure: 10 mm @ 150° C.; Test: @ 100° C., Pulling Speed = 50 cm/min, Adhesion To = Itself

| | | | | | |
| --- | --- | --- | --- | --- | --- |
| Tear Strength | N/mm | 30.3 | 5.4 | 31.3 | 13.1 |

Cold Tensile D53504

Cure: 10 mm @ 150° C.; Test: @ 23° C., Pulling Speed = 20 cm/min
Direction: parallel to fibers

| | | | | | |
| --- | --- | --- | --- | --- | --- |
| Elongation | % | 480.1 | 147.0 | 488.3 | 216.3 |
| Elongation Relative to Sample 1 | | 1 | 0.31 | 1.02 | 0.45 |
| 100% Modulus | MPa | 4.0 | 12.7 | 3.3 | 8.7 |
| 200% Modulus | MPa | 10.7 | 13.1 | 8.9 | 10.8 |
| Tensile Strength | MPa | 33.5 | 12.1 | 33.3 | 10.9 |

Direction: perpendicular to fibers

| | | | | | |
| --- | --- | --- | --- | --- | --- |
| Elongation | % | 458.1 | 219.0 | 489.4 | 266.5 |
| Elongation Relative to Sample 1 | | 1 | 0.48 | 1.07 | 0.58 |
| 100% Modulus | MPa | 4.0 | 5.9 | 2.8 | 5.2 |
| 200% Modulus | MPa | 10.7 | 10.2 | 8.0 | 8.2 |
| Tensile Strength | MPa | 31.7 | 11.0 | 31.9 | 10.4 |

As seen in Table 3, the rubber sample including the combination of polyketone fiber and polyethyleneimine showed a surprising and unexpected improvement in physical properties compared to samples containing only the polyketone fiber or only the polyethyleneimine. In particular, the elongation at break indicates an unexpected interaction between the polyketone fibers and polyethyleneimine. The effect is seen best with cold tensile tests done with the test pulling direction parallel with the milling direction of the specimen. A relative elongation at break was calculated for each sample by dividing the elongation of the sample with that of Sample 1. Sample 2 with polyketone fibers but no polyethyleneimine showed a relative elongation of 0.31, indicating poor interaction the fibers with the base elastomer (natural rubber). Sample 3 with polyethyleneimine but no polyketone fibers showed a relative elongation of 1.02, indicating little effect of adding the polyethyleneimine on elongation. However, Sample 4 with polyketone fibers and polyethyleneimine showed a relative elongation of 0.45, indicating a surprising interaction between the polyketone fibers and polyethyleneimine resulting in unexpectedly improved elongation as compared with Sample 2.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, the at least one component comprising a rubber composition, the rubber composition comprising a diene based elastomer and from 1 to 30 parts by weight, per 100 parts by weight of elastomer (phr), of a polyketone short fiber having a length ranging from 0.5 to 20 mm having a weight ranging from 0.5 to 5 decitex, and from 1 to 15 phr of a polyethyleneimine having an average molecular weight of 800 to 2000000.

2. The pneumatic tire of claim 1, wherein the polyethyleneimine has an average molecular weight of 1000 to 20000.

3. The pneumatic tire of claim 1, wherein the polyethyleneimine has an average molecular weight of 2000 to 4000.

4. The pneumatic tire of claim 1, wherein the polyethyleneimine is present in a concentration of 1.5 to 10 phr.

5. The pneumatic tire of claim 1, wherein the amount of polyketone fiber ranges from 2 to 20 phr.

6. The pneumatic tire of claim 1, wherein the component is selected from the group consisting of apexes, flippers and chippers.

7. The pneumatic tire of claim 1, wherein the component is a flipper.

8. The pneumatic tire of claim 7, wherein the flipper is disposed with the short fibers substantially oriented in an angle ranging from 0 to 90 degrees with respect to the radial direction of the tire.

9. The pneumatic tire of claim 7, wherein the flipper is disposed with the short fibers substantially oriented in an angle ranging from 0 to 45 degrees with respect to the radial direction of the tire.

10. The pneumatic tire of claim 7, wherein the flipper is disposed with the short fibers substantially oriented in an angle ranging from 0 to 20 degrees with respect to the radial direction of the tire.

11. The pneumatic tire of claim 7, wherein the flipper is disposed with the short fibers substantially oriented in an angle ranging from 0 to 10 degrees with respect to the radial direction of the tire.

* * * * *